United States Patent
Jeong

(10) Patent No.: US 7,675,006 B2
(45) Date of Patent: Mar. 9, 2010

(54) TEMPERATURE SENSING CIRCUIT IN COOKING APPLIANCE AND CONTROLLING METHOD OF THE SAME

(75) Inventor: Shin Jae Jeong, Jinhae-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/657,067

(22) Filed: Jan. 24, 2007

(65) Prior Publication Data

US 2007/0170167 A1    Jul. 26, 2007

(30) Foreign Application Priority Data

Jan. 25, 2006    (KR)    ...................... 10-2006-0007704

(51) Int. Cl.
*H05B 1/02*    (2006.01)

(52) U.S. Cl. ...................... 219/494; 219/497; 219/486; 219/501; 99/329 R; 99/333

(58) Field of Classification Search ................. 219/494, 219/497, 499, 501, 505, 506, 504, 483–486, 219/412–415; 99/325–331
See application file for complete search history.

(56) References Cited

U.S. PATENT DOCUMENTS

| 4,484,050 | A | | 11/1984 | Horinouchi et al. ....... 219/10.55 |
| 5,140,302 | A | | 8/1992 | Hara et al. .................. 340/449 |
| 5,705,791 | A | * | 1/1998 | Sutton et al. ................. 219/492 |
| 2006/0219700 | A1 | * | 10/2006 | Chen et al. .................. 219/497 |

FOREIGN PATENT DOCUMENTS

WO    WO 91/08441    6/1991

* cited by examiner

*Primary Examiner*—Mark H Paschall
(74) *Attorney, Agent, or Firm*—Ked & Associates LLP

(57) ABSTRACT

A temperature sensing circuit and a method of automatically controlling the temperature sensing circuit in a cooking apparatus for more accuracy are provided. In the method, the low temperature table and the high temperature table are selectively used based on a current temperature of a cooking chamber, when cooking is ended. The low temperature table and the high temperature table are selectively used based on preset cooking temperatures for different types of cooking together with a current temperature of the cooking chamber, while cooking is performed.

8 Claims, 4 Drawing Sheets

TEMPERATURE SENSING CIRCUIT IN COOKING APPLIANCE AND CONTROLLING METHOD OF THE SAME

BACKGROUND OF THE INVENTION

1. Field of the Invention

The present invention relates to a temperature sensing circuit, and more particularly, to a temperature sensing circuit in a cooking appliance that uses one temperature sensor to accurately measure temperatures of a low temperature range and a high temperature range to aid in the precision controlling of the cooking appliance, and to a controlling method of the temperature sensing circuit.

2. Description of the Related Art

In general, a cooking appliance uses a temperature sensor for measuring the temperature inside a heated cooking compartment.

Thermistors are widely used as temperature sensors in cooking appliances, and can be divided into negative temperature coefficient (NTC) type thermistors whose resistance values decrease with an increase in temperature, and positive temperature coefficient (PTC) type thermistors whose resistance values increase with an increase in temperature.

A cooking appliance uses one thermistor that displays a change in its resistance value to reflect a change in temperature in the cooking appliance. Also, the change in the resistance value is amplified using a temperature sensing circuit, to estimate the temperature inside the cooking appliance. Thus, the resistance value detected by the temperature sensor is amplified according to the gain in an amplifier to change the gain of the resistance value, after which the resistance value is outputted to a microprocessor. Then, a temperature table of a low temperature range is used when the gain of the resistance value is high, and a temperature table of a high temperature range is used when the gain is low.

Therefore, in the case of a low temperature range, because the slope of the sensor output voltage according to the inner temperature of the cooking appliance becomes greater compared to a high temperature range, a high resolution can be obtained.

However, in most cases where food is cooked, because a cooking appliance is heated to a high temperature, a temperature table of a high temperature range is used in performing the cooking. Only in special cases, such as a rising or keep warm cycle, is a temperature table of a low temperature range used. That is, the type of temperature table to be used is predetermined according to the type of cooking to be done.

Thus, when a cooking appliance operates, although the temperature inside the cooking chamber at the start of cooking is low, because a high temperature table is used based on a cooking temperature preset according to type of food, accurately maintaining a constant temperature is difficult. That is, because a temperature table of a high temperature range with a low gain of a resistance value is used in most cases, the temperature table of a low temperature range is hardly used.

SUMMARY OF THE INVENTION

Accordingly, the present invention is directed to a temperature sensing circuit in a cooking appliance and a controlling method thereof that substantially obviates one or more problems due to limitations and disadvantages of the related art.

An object of the present invention is to provide a temperature sensing circuit of a cooking appliance and an automatic controlling method of the temperature sensing circuit that automatically use temperature tables of a high temperature range and a low temperature range.

Another object of the present invention is to provide a temperature sensing circuit of a cooking appliance and an automatic controlling method of the temperature sensing circuit that selects an appropriate temperature table from high and low temperature ranges by considering not only a preset cooking temperature based on the type of food to be cooked but also the current temperature inside the cooking chamber, for more accurate controlling of cooking temperature.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method of controlling a temperature sensing circuit of a cooking appliance, the temperature sensing circuit differentiating a low temperature range and a high temperature range through a temperature sensor and selectively using a low temperature table for the low temperature range and a high temperature table for the high temperature range, the method including: selectively using the low temperature table and the high temperature table based on a current temperature of a cooking chamber, when cooking is ended; and selectively using the low temperature table and the high temperature table based on preset cooking temperatures for different types of cooking together with a current temperature of the cooking chamber, while cooking is performed.

In another aspect of the present invention, there is provided a method of controlling a temperature sensing circuit of a cooking appliance, including: selecting a high temperature table and a low temperature table, when a temperature of a cooking chamber is above a first set temperature T1 and below the first set temperature T1, respectively, after cooking is ended and is about to resume; considering a current temperature of the cooking chamber and a preset cooking temperature corresponding to a type of the cooking, when the cooking resumes; maintaining the low temperature table for a predetermined duration, and then selecting and using the high temperature table, when the low temperature table is selected; and continuously using the high temperature table, when the high temperature table is selected and used.

In a further aspect of the present invention, there is provided a temperature sensing circuit of a cooking appliance, including: a thermistor installed in the cooking appliance, for outputting a resistance value varying according to a temperature; at least two reference resistances combined with the resistance value of the thermistor; a switching device for switching at least one of the reference resistances on and off; an amplifier for amplifying a voltage divided through the thermistor; and a microprocessor for controlling an operation of the switching device to determine a temperature of the cooking appliance through using a temperature table of a low temperature range when the switching device is turned on, and determine the temperature of the cooking appliance through using a temperature table of a high temperature range when the switching device is turned off, wherein the microprocessor turns the switching device on in a current cooking stage when the temperature of the cooking device sustained by a residual heat from a previous cooking stage falls below a first set temperature T1, and turns the switching device off when the temperature of the cooking device rises above a fourth set temperature T4.

According to the present invention, the change in a resistance value provided by one thermistor is maximally exploited to determine the temperature inside the cooking appliance.

It is to be understood that both the foregoing general description and the following detailed description of the present invention are exemplary and explanatory and are intended to provide further explanation of the invention as claimed.

DETAILED DESCRIPTION OF THE INVENTION

Reference will now be made in detail to the preferred embodiments of the present invention, examples of which are illustrated in the accompanying drawings. The invention may, however, be embodied in many different forms and should not be construed as being limited to the embodiments set forth herein.

Figure 1:
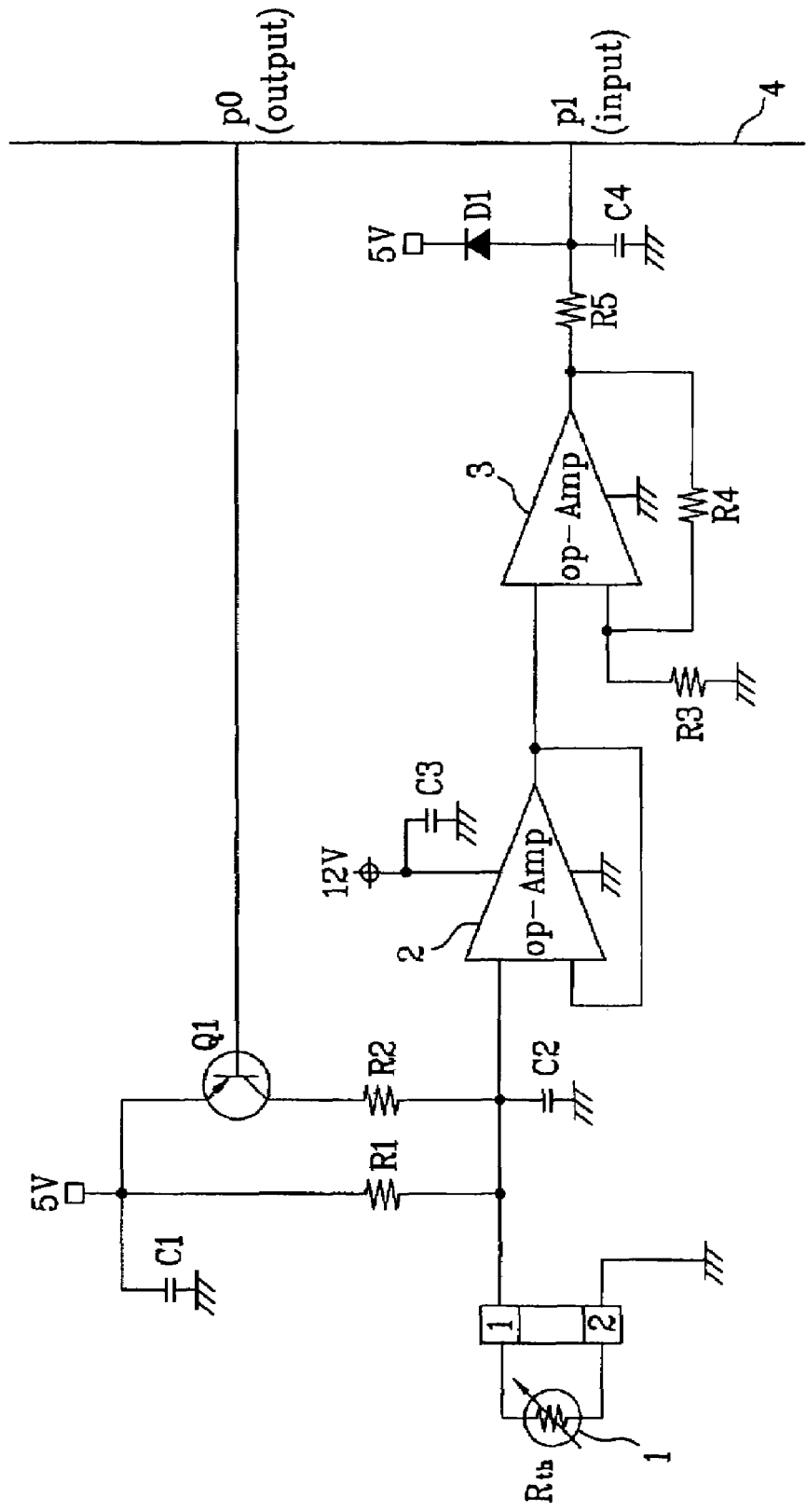
FIG. 1 is a circuit diagram of a temperature sensing circuit using a thermistor employing a low and a high temperature range.

FIG. 1 is a circuit diagram of a temperature sensing circuit formed with a PTC type thermistor.

The PTC type thermistor used in the temperature sensing circuit detects an increase in resistance value as temperature increases, and uses the resistance value to estimate the temperature. The circuit is structured such that one thermistor 1 may be used to detect temperatures in low and high temperature ranges.

Referring to FIG. 1, the temperature sensing circuit according to the present invention includes a thermistor 1 whose resistance varies according to temperature change, a first and a second reference resistors R1 and R2, a transistor Q1 for switching the connected state of the second reference resistor R2, a voltage follower 2 that receives a divided voltage input according to a resistance value Rth of the first and/or second resistances of first and second reference resistors R1 and/or R2, an amplifier 3 for amplifying a voltage level outputted from the voltage follower 2, and a microprocessor 4 for controlling the transistor Q1 according to a temperature range for cooking and for reading the voltage level outputted from the amplifier 3 and determining the current temperature.

Here, the voltage follower 2 is used to reduce the impedance effect of the inputted divided voltage. The amplifier 3 amplifies the inputted voltage according to a gain of (1+R4/R3), and outputs the same to the microprocessor 4.

In this configuration, the microprocessor 4 divides low temperature ranges and high temperature ranges according to preset cooking temperatures for different foods, and detects the temperature. First, when a temperature table for a low temperature range is used, an output p0 is used to turn on the transistor Q1. Then, the second reference resistor R2 is connected in line with the first reference resistor R1, and the microprocessor 4 determines the current temperature through a divided voltage based on the sum of resistances of the first and second reference resistors R1 and R2 ((R1*R2)/(R1+R2)) and the resistance value Rth of the thermistor 1.

That is, the microprocessor 4 first turns the transistor Q1 on, and uses the low temperature table to determine the current temperature corresponding to the voltage level inputted through an input p1.

When using a temperature table of a high temperature range, a control signal is outputted through the output p0, and the transistor Q1 is turned off. Then, by dividing the second reference resistance R2, the microprocessor 4 determines the current temperature through the voltage divided by the first reference resistance and the resistance value Rth of the thermistor 1.

That is, after the microprocessor 4 turns off the transistor Q1, it uses the high temperature table to determine the current temperature corresponding to the voltage level inputted through the input p1.

The temperature table of the high temperature range (hereinafter called the "high temperature table") and the temperature table of the low temperature range (hereinafter called the "low temperature table") will be described with reference to FIG. 2.

Figure 2:
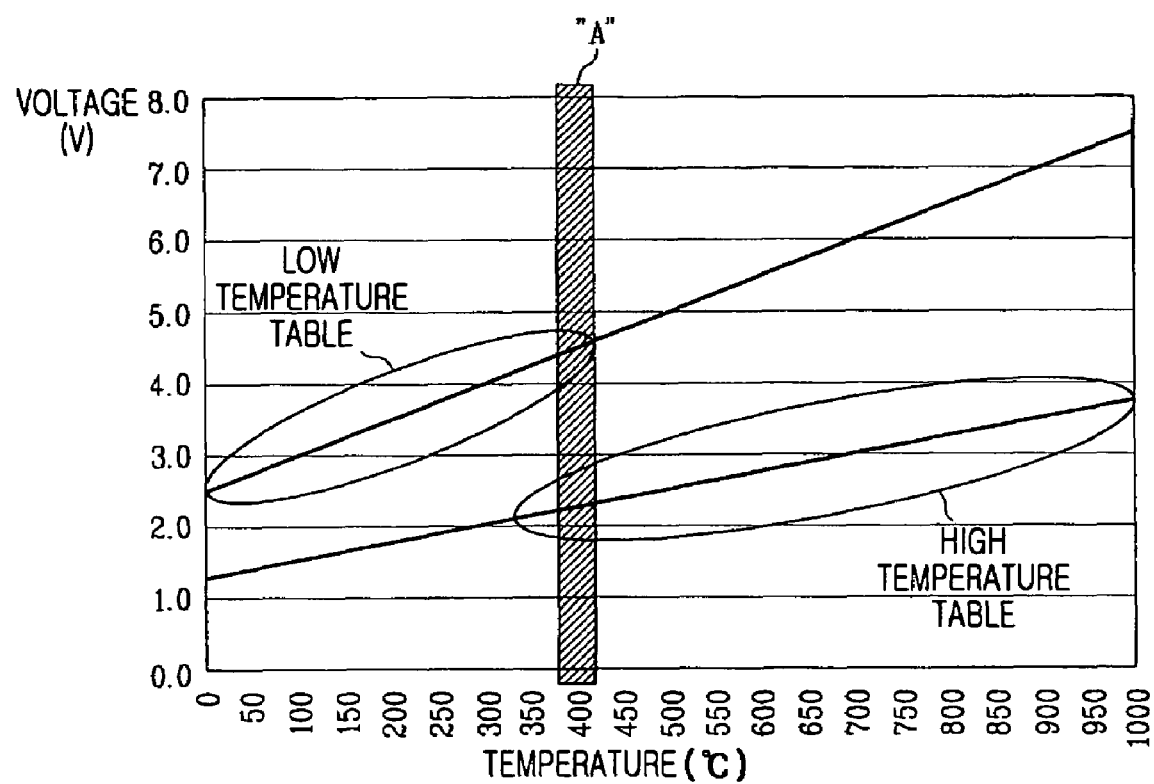
FIG. 2 is a graph showing sensor outputs according to temperatures in a low and a high temperature range.

Referring to FIG. 2, the low temperature table and the high temperature table are structured to have a shared region "A". That is, the voltage-temperature values of the region represented by "A" may exist in both the low temperature table and the high temperature table. As such, temperature control may be controlled repeatedly between the high temperature table and the low temperature table. Although FIG. 2 clearly exaggerates a discrepancy in voltage-temperature values between the low temperature table and the high temperature table, in reality, the resolution of resistance values of the low temperature table is made higher than that of the high temperature table.

Figure 3:
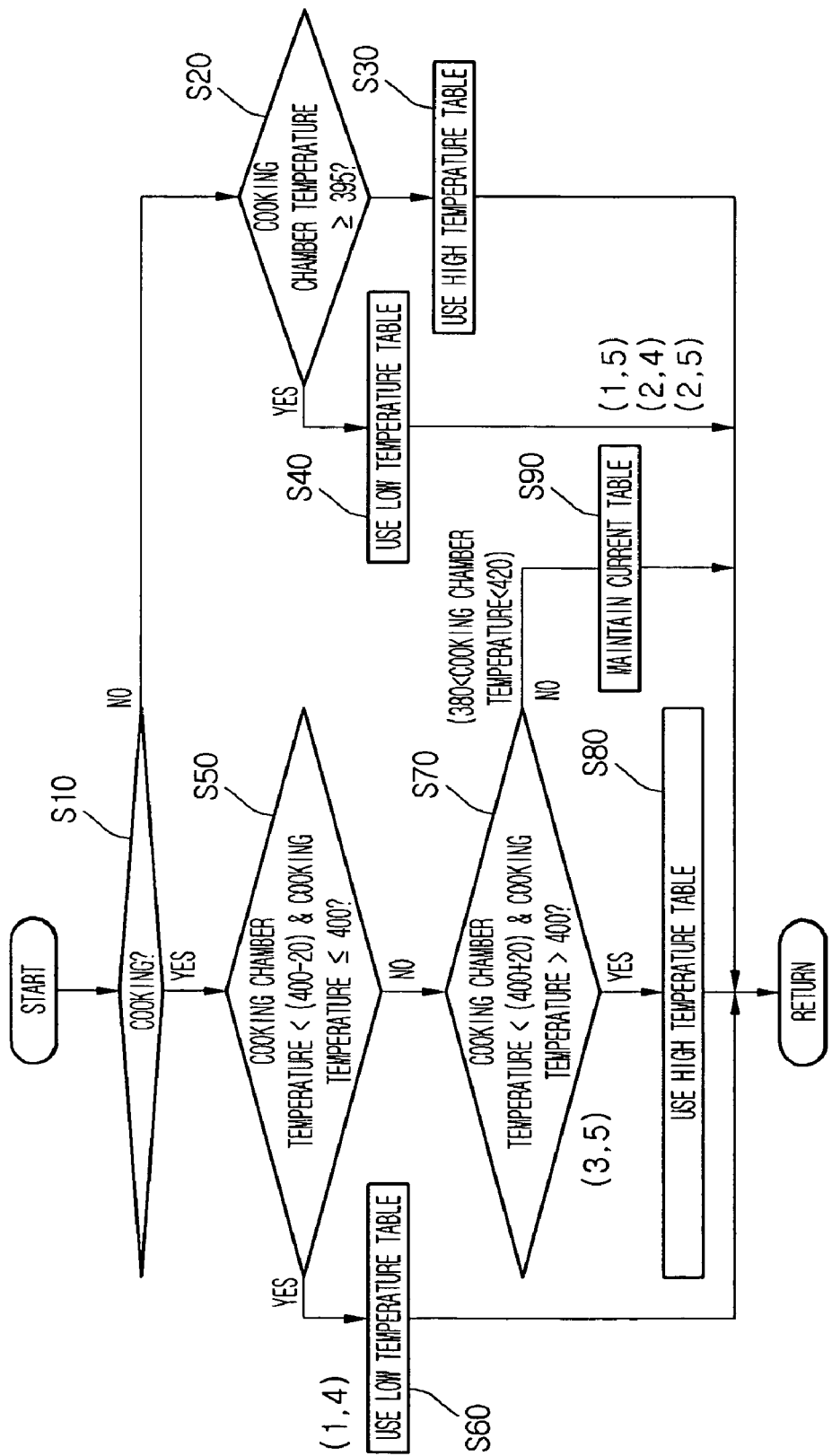
FIG. 3 is a flowchart of an automatic controlling method of a temperature sensing circuit in a cooking appliance according to the present invention.

FIG. 3 is a flowchart of an automatic controlling method of a temperature sensing circuit in a cooking appliance according to the present invention.

Referring to FIG. 3, first, after the cooking that was being performed is ended, the temperature inside the cooking chamber is read at regular intervals in step S10, and it is determined in step S20 whether the read temperatures are greater than a first set temperature T1.

Here, the first set temperature T1 may be set as a maximum temperature value in the low temperature table (395° C., for example) that overlaps with the high temperature table, in order to maximally use the low temperature table.

When the determining of step S20 indicates that the temperature inside the cooking chamber exceeds the first set temperature T1, the transistor Q1 is turned off and a divided voltage according to the resistance of the first reference resistor R1 and the resistance value Rth of the thermistor 1 is read, and the high temperature table is used to determine the current temperature corresponding to the read voltage level in step S30.

When it is determined in step S20 that the temperature inside the cooking chamber is below the first set temperature T1, the transistor Q1 is turned on, and a divided voltage according to the in-line aggregate resistance ((R1*R2)/(R1+R2)) of the first and second reference resistors R1 and R2 and the resistance value Rth of the thermistor 1 are read, and the low temperature table is used to determine the current temperature corresponding to the read voltage level in step S40.

As described, the controlling of the temperature after the end of cooking selectively uses the low temperature and high temperature tables, while considering the high temperature level.

When cooking is begun, the current high temperature in the cooking chamber and a preset cooking temperature suitable for the cooking are read.

The read high temperature and cooking temperature are determined in step S50, and when the determined result shows that the temperature inside the cooking chamber is less than a second set temperature T2, and the cooking temperature is less than a third set temperature T3 at the same time, the low temperature table is used to determine the current temperature in step S60.

Here, the second set temperature T2 may be set at a maximum temperature value for the low temperature range (380° C., for example) that is included as well in the high temperature table. The third set temperature T3, as a reference temperature for determining whether to use the high temperature table or the low temperature table, may be set as a maximum temperature value (400° C., for example) of the low temperature range that overlaps with the high temperature table, in order to maximally use the low temperature table.

If the temperature inside the cooking chamber is found to exceed a fourth set temperature T4 in step S70, the high temperature table is used to determine the current temperature in step S80.

Here, the fourth set temperature T4 may be set as a maximum temperature value of the high temperature range (420° C., for example), that does not overlap with the low temperature table.

When the temperature inside the cooking chamber exceeds the second set temperature T2 and is below the fourth set temperature T4, the table to be chosen before cooking is begun is maintained as the current table in step S90. Here, after the temperature inside the cooking chamber at the start of cooking is cooled to less than the first set temperature T1, the low temperature table is used; and before the temperature is cooled to less than the first set temperature T1, cooking is resumed, and the high temperature table is used as is.

Accordingly, the present invention applies an automatic switching algorithm for using tables based on the temperature inside the cooking chamber during cooking and after cooking has ended, so that accurate temperature measurements can be taken of the cooking appliance.

Figure 4:
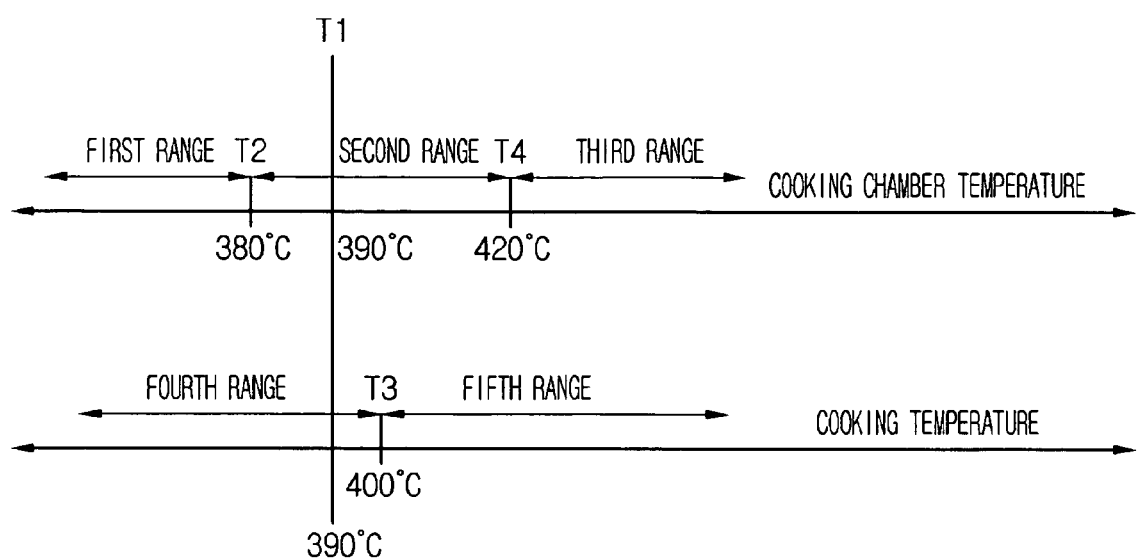
FIG. 4 is a supplemental line graph showing controlling methods of a cooking chamber temperature and a cooking temperature.

To aid in further describing the above method according to the present invention, FIG. 4 provides a supplemental line graph showing controlling methods of a cooking chamber temperature and a cooking temperature.

Referring to FIGS. 4 and 3, the temperature inside the cooking chamber includes the second set temperature T2 and the fourth set temperature T4, and the cooking temperature is divided into ranges above and below the third set temperature T3. That is, the temperature inside the cooking chamber is divided into first, second, and third ranges, and the cooking temperature is divided into fourth and fifth ranges, so that there are six combinations thereof. Here, since the temperature inside the cooking chamber cannot be higher than the cooking temperature, such a case may be treated as an error. Thus, it is presumed that the temperature inside the cooking chamber will not be higher than the cooking temperature.

Here, when the controlling method according to the present invention in being performed and cooking is being implemented, the temperature of the cooking chamber and the cooking temperature are combined and the low temperature table or the high temperature table is used. Here, step S60 using the low temperature table, step S80 using the high temperature table, and step S90 using the current table are implemented in the present invention. In FIG. 3, the former numbers in the brackets denote the temperature range of the cooking chamber, and the latter numbers denote the cooking temperature range.

The controlling method according to the present invention is configured as below.

First, when the temperature inside the cooking chamber at the starting point of cooking cools to below the second set temperature T2, the low temperature table is used regardless of the cooking temperature, and the low temperature table is used while the temperature of the cooking chamber rises. Then, when the temperature of the cooking chamber exceeds the fourth temperature T4, the high temperature table is used and is continually used.

Also, when cooking is resumed before the temperature of the cooking chamber falls below the second set temperature T2, the high temperature table is continuously used.

When the temperature of the cooking chamber is between the second set temperature T2 and the first set temperature T1 at the start of cooking, the low temperature table is first used, and the high temperature table is used when the temperature of the cooking chamber exceeds the fourth set temperature T4.

In the above embodiment or other embodiments, regardless of the set cooking temperature, the low temperature table is always selected when cooking is begun, and the high temperature table may be selected according to a rise in the temperature of the cooking compartment when cooking has progressed.

The current temperature of the cooking chamber, the current cooking temperature, and a previous temperature of the cooking chamber are used together to select a temperature table for use, in order to obtain a more accurate reading of the temperature of the cooking chamber. Thus, the cooking temperature of food can be optimized for best results.

Also, because the low temperature table with a higher resolution than the high temperature table can be maximally used, the temperature of the cooking chamber can more accurately be determined.

Furthermore, because the operating characteristics of a PTC type thermistor can be fully exploited, a still further degree of accuracy in measuring the temperature can be realized.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of controlling a cooking appliance, the method comprising:

selectively using a low temperature table or a high temperature table based on preset cooking temperatures for different types of cooking or foods to automatically control a temperature sensing circuit to determine a current temperature of a cooking chamber during a cooking operation; and selectively using the low temperature table or the high temperature table to determine a current temperature of the cooking chamber after the cooking operation of the cooking appliance has ended, wherein selectively using the low temperature table or the high temperature table during the cooking operation comprises:

reading the current temperature of the cooking chamber and a preset cooking temperature corresponding to a type of food or the cooking being performed when the cooking operation is begun; and using the low temperature table when the read current temperature is below a second set temperature T2 and the cooking temperature is below a third set temperature T3, using the high temperature table when the read current temperature is above a fourth set temperature T4, and maintaining a temperature table selected prior to the cooking operation when the read current temperature is above the second set temperature T2 and below the fourth set temperature T4.

2. The method according to claim 1, wherein selectively using the low temperature table or the high temperature table when the cooking operation of the appliance has ended comprises:

reading the current temperature of the cooking chamber at regular intervals when the cooking operation has ended; and using the low temperature table when the read current temperature is below a first set temperature T1, and using the high temperature table when the read current temperature is above the first set temperature T1.

3. The method according to claim 1, wherein the low temperature table includes table values for a temperature range below the second set temperature T2, the high temperature table includes table values for a temperature range above the fourth set temperature T4, and table values in a temperature range above the second set temperature T2 and below the fourth set temperature T4 are shared by the high temperature table and the low temperature table.

4. The method according to claim 1, wherein the current temperature of the cooking chamber after the cooking operation has ended is based on residual heat that exists in the cooking chamber as a result of the cooking operation.

5. The method according to claim 1, further comprising:

receiving a signal to resume the cooking operation or to begin a new cooking operation; and if the current temperature of the cooking chamber is above a predetermined temperature, then automatically setting a temperature-sensing circuit of the cooking apparatus to a first setting and using the high temperature table to determine the temperature of the cooking chamber based on an output signal of the temperature-sensing circuit in said first setting; and if the current temperature of the cooking chamber is below a predetermined temperature, then automatically setting a temperature-sensing circuit of the cooking apparatus to a second setting and using the low temperature table to determine the temperature of the cooking chamber based on an output signal of the temperature-sensing circuit in said second setting, wherein the predetermined temperature corresponds to a maximum temperature value in a predetermined range of temperatures corresponding to the high temperature table.

6. A method of controlling a cooking appliance, the method comprising:

selectively using a low temperature table or a high temperature table based on preset cooking temperatures for different types of cooking or foods to automatically control a temperature sensing circuit to determine a current temperature of a cooking chamber during a cooking operation; and selectively using the low temperature table or the high temperature table to determine a current temperature of the cooking chamber after the cooking operation of the cooking appliance has ended, wherein:

the low temperature table corresponds to a first curve that defines a relationship between a current temperature-sensing voltage and a first predetermined temperature range, the high temperature table corresponds to a second curve that defines a relationship between the current temperature-sensing voltage and a second predetermined temperature range, the first and second curves do not intersect, and the first and second predetermined temperature ranges include a third predetermined temperature range that overlaps the first and second predetermined temperature ranges, the third predetermined range being substantially smaller that the first and second predetermined ranges.

7. A method of controlling a cooking appliance, the method comprising:

selectively using a low temperature table or a high temperature table based on preset cooking temperatures for different types of cooking or foods to automatically control a temperature sensing circuit to determine a current temperature of a cooking chamber during a cooking operation; and selectively using the low temperature table or the high temperature table to determine a current temperature of the cooking chamber after the cooking operation of the cooking appliance has ended, wherein during the cooking operation:

when the current temperature is less than a first predetermined temperature and a second predetermined temperature, automatically setting a temperature-sensing circuit to a first setting and using the low temperature table to determine a current temperature of the cooking chamber, the first predetermined temperature less than the second predetermined temperature;

wherein the first predetermined temperature is a maximum temperature in a first predetermined range of temperatures included in the low-temperature table, and wherein the second predetermined temperature is a minimum temperature in a second predetermined range of temperatures included in the high-temperature table, wherein the first and second temperature ranges are mutually exclusive and wherein a third predetermined range is an overlapping range of temperatures that corresponds to both of the low and high temperature tables.

8. The method according to claim 7, further comprising:

when the current temperature is less than a third predetermined temperature that is between the first and third predetermined temperatures, then continuing to use the low temperature table to detect the current temperature of the cooking chamber, wherein the third predetermined temperature is included in the third predetermined temperature range.

* * * * *